Dec. 5, 1961  H. A. BRASCH  3,011,562
LAWN EDGER
Filed May 13, 1960
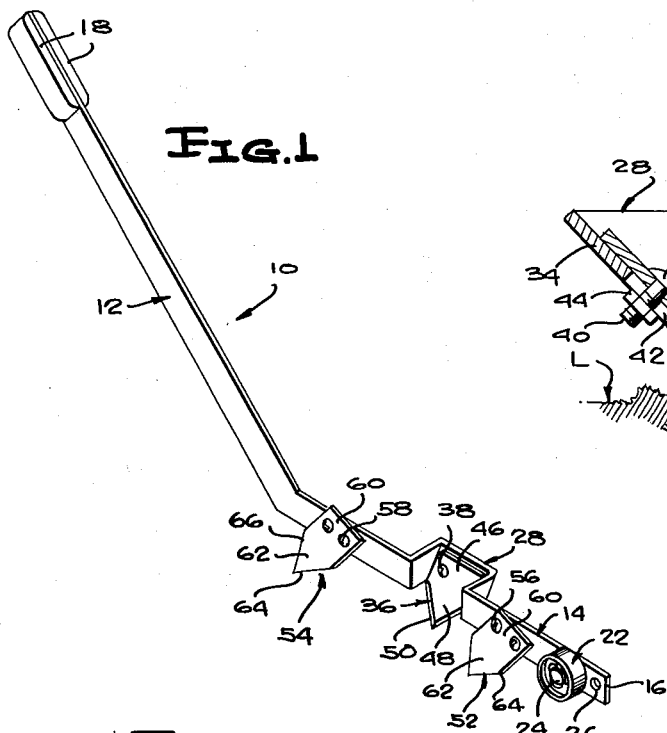
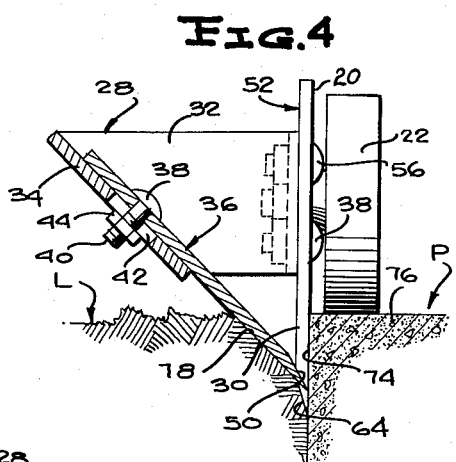
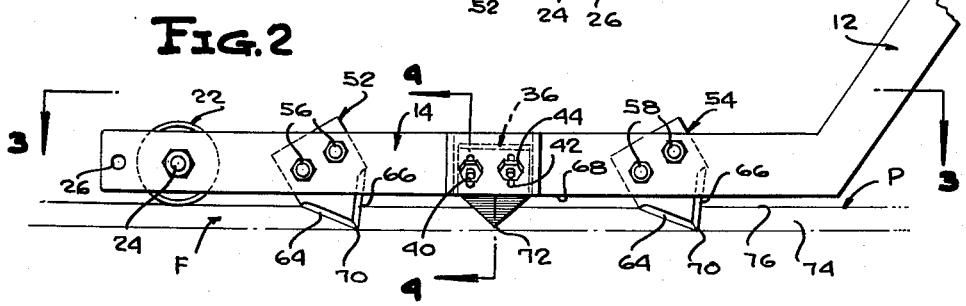
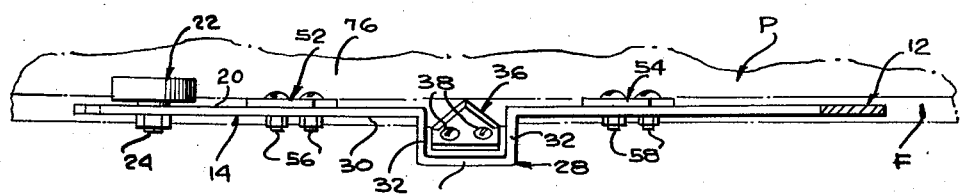
INVENTOR.
HERMAN A. BRASCH
BY
*McMorrow, Berman + Davidson*
ATTORNEYS

United States Patent Office 3,011,562
Patented Dec. 5, 1961

3,011,562
LAWN EDGER
Herman A. Brasch, 1515 W. Lincoln Blvd., Freeport, Ill.
Filed May 13, 1960, Ser. No. 28,999
2 Claims. (Cl. 172—17)

This invention relates to a novel and improved lawn edger, especially but not exclusively, for edging lawns along roads and walks.

The primary object of the invention is the provision of a more efficient and effective manually operated edger of the kind indicated, which requires less exertion and skill in its use, and which is adjustable to cut sod to different desired depths, merely by holding its handle at the required angles when moving the edger along the edge of a lawn.

Another object of the invention is to provide a simple and uncomplex edger of the character indicated above, which is formed of simple and easily assembled parts, and wherein its blades are easily removable for replacement and for sharpening.

Other important objects and advantageous features of the invention will be apparent from the following description and the accompanying drawings, wherein, for purposes of illustration only a specific form of the invention is set forth in detail.

In the drawings:

FIGURE 1 is a perspective view of a lawn edger of the present invention;

FIGURE 2 is an enlarged fragmentary side elevation thereof;

FIGURE 3 is a horizontal section taken on the line 3—3 of FIGURE 2; and,

FIGURE 4 is a schematic vertical transverse section, taken on the line 4—4 of FIGURE 2, showing the edger applied to a walk and an adjacent edge of a lawn and forming a furrow therealong.

Referring in detail to the drawings, wherein like numerals designate like parts throughout the several views, the illustrated edger, generally designated 10, comprises an elongated straight and upwardly and rearwardly angled flat handle bar 12, which, at its lower forward end, is integral with or joined to the rear end of a horizontal flat bar 14, having a free forward end 16, the widths of the bars 12 and 14 being in the same plane; and the handle bar 12 being, in a full-size embodiment, substantially longer than the horizontal bar 14, so that stooping in operating the edger is eliminated. Suitably fixed to opposite sides of the handle bar 12, at its upper end, are hand-grip blocks 18.

Mounted on the horizontal bar 14, at the side 20 thereof, and at a point near to but spaced rearwardly from the forward end 16, is a roller 22, which is journalled on a bolt 24, secured through the bar 14. A hang-up hole 26 is provided in the bar 14 forwardly of the roller 22.

At a point intermediate its ends, the horizontal bar 14 is formed with a lateral offset 28 which reaches beyond the side 30 of the bar 14, and which is preferably a U-shape having longitudinally spaced, parallel arms 32, and a bight portion 34 which is disposed at a laterally inward and downward angle of about 45 degrees relative to the bar 14.

Removably fixed on the laterally inward side of the bight portion 34 of the off-set 28 is a furrow digging blade 36, through which extend a pair of bolts 38 whose shanks 40 are positioned through parallel vertical slots 42 formed in the bight portion 34, and have thereon nuts 44 which bear against the laterally outward side of the bight portion. The blade 36 is flat and comprises a rectangular upper bearing portion 46, in which the bolts 38 are located, and an inverted triangular lower cutting portion 48, the latter being bevelled, at the laterally inward side thereof, to provide downwardly convergent cutting edges 50. The bolts 38 and the slots 42 provide for vertical adjustment of the blade 36, relative to the horizontal bar 14, to predetermine the depth of a furrow made by the blade 36.

Removably fixed on the side 20 of the horizontal bar 14, at points substantially midway between the roller 22 and the offset 28, and midway between the off-set 28 and the rear end of the bar 14, are similar forward and rear sod-cutting blades 52 and 54, respectively, which are tilted rearwardly, relative to the length of the bar 14, at acute angles, preferably of less than 45 degrees, and are fixed in place by pairs of bolts 56 and 58, respectively, extending through these blades and the bar 14. The sod-cutting blades are flat, have rectangular upper bearing portions 60 and inverted triangular lower cutting portions 62. The cutting portions 62 of the blades 52 and 54 are bevelled on the sides thereof facing the bar 14 to provide downwardly converging sharp forward shearing edges 64, and rear ripping edges 66, respectively. The blades 52 and 54 are disposed in the vertical plane of the bar 14 for producing a vertical edge 74 on the sod of a lawn L, adjacent to a pavement P, while the blade 36 is disposed at an angle, so as to produce a bevelled edge 78 on the lawn L.

As shown in FIGURES 2 and 4, the forward edges 64 of the sod-cutting blades 52 and 54 are located below the lower edge 68 of the bar 14, at substantially the same distances, and the apices 70 of their cutting portions 62, are on a level slightly below the apex 72 of the cutting portion 48 of the furrow-cutting blade 36, and the lower side of the roller 22 is on a level above the forward cutting edges 64 and near to the lower edge 68 of the bar 14.

As indicated in FIGURES 3 and 4, the edger 10 is applied, to edge a lawn L along a walk or road pavement P having a side edge 74 facing the lawn L, by depressing the sod-cutting blades 52 and 54 into the lawn L, along the pavement P, with the roller 22 bearing upon the upper surface 76 of the pavement and with the laterally outward sides of the blades 52 and 54 bearing against the pavement edge 74, whereat the edger is moved lengthwise of the pavement edge, in either direction, by holding and pushing and pulling on the handle bar 12. Forward movement of the edger 10 along the pavement and its edge 74 produces cutting of the sod of the lawn L, including roots embedded therein, by the acutely angled forward cutting edges 64 thereof, whereas rearward operation of the edger produces cutting of the sod by their nearly perpendicular and slightly rearwardly angled rear cutting edges 66, the difference in effect being that the forward cutting edges 64 have a shearing action, while the rear cutting edges 66 have a direct or more right angular cutting or ripping action, for severing tough roots which may be resistant to the shearing action of the forward edges 64.

As the edger 10 is moved forwardly or rearwardly, the similarly angled edger furrow cutting blade 36 and the blades 52 and 54 cut a furrow F, of triangular cross-section, along the side edge 74 of the pavement P, the blade 36 itself forms a 45 degree side 78 of the furrow F, and thereby producing a clean and smooth 45 degree edge on the lawn L. The depth of cut of the blades is adapted to be selected and determined by the angle at which the handle bar 12 is held by the operator of the edger 10, so that the horizontal bar 14 is in effect pivoted on the axis of the roller 22, to a horizontal position or to an elevated position above or to a depressed position below the horizontal.

While there has been shown and described herein a preferred form of the invention, it is to be understood that the invention is not necessarily confined thereto, and

What is claimed is:

1. A lawn edger comprising an elongated normally horizontal bar having forward and rear ends, a roller journalled on one side of said bar at said forward end, a furrow-cutting blade fixed on said bar at a location between the roller and the rear end of the bar, said furrow-cutting blade being downwardly and laterally angled relative to the bar and extending below the bar, a forward sod-cutting blade located between the roller and the furrow-cutting blade and fixed to the bar, a rear sod-cutting blade located between the furrow-cutting blade and the rear end of the bar and fixed to the bar, said forward and rear sod-cutting blades being downwardly-angled relative to the bar and extending below the bar and being disposed substantially in the vertical plane of the bar, the furrow cutting blade having a lower end positioned in the vertical plane of the sod-cutting blades, said bar having a U-shaped offset extending from the side of the bar remote from the roller, said offset having a downwardly and laterally bight portion, said furrow-cutting blade having an upper portion bearing upon and fixed to said bight portion.

2. A lawn edger comprising an elongated normally horizontal bar having forward and rear ends, a roller journalled on one side of said bar at said forward end, a furrow-cutting blade fixed on said bar at a location between the roller and the rear end of the bar, said furrow-cutting blade being downwardly and laterally angled relative to the bar and extending below the bar, forward and rear sod-cutting blades fixed to and disposed substantially in the vertical plane of the bar and extending below the bar, the forward blade being located between the roller and the furrow-cutting blade and the rear blade between the furrow-cutting blade and the rear end of the bar, said forward and rear blades being fixed to said one side of the bar, said forward and rear blades having inverted triangular lower portions extending below the bar, the sides of said lower portions of the forward and rear blades having bevelled cutting edges, and the sides of the lower portion of the furrow-cutting blade having bevelled cutting edges, the cutting edges of the forward and rear blades facing said one side of the bar, and the cutting edges of the furrow-cutting blade facing away from said one side.

References Cited in the file of this patent

UNITED STATES PATENTS

| | | |
|---|---|---|
| 892,027 | Cahoon | June 30, 1908 |
| 971,000 | Fleming | Sept. 20, 1910 |
| 1,163,882 | Boge | Dec. 14, 1915 |
| 1,481,465 | Halverson | Jan. 22, 1924 |
| 1,523,797 | Bauer | Jan. 20, 1925 |
| 2,139,353 | Bruder | Dec. 6, 1938 |
| 2,634,667 | Woolwine | Apr. 14, 1953 |
| 2,722,796 | Erickson | Nov. 8, 1955 |
| 2,787,057 | Bell | Apr. 2, 1957 |